United States Patent
Atluri

(10) Patent No.: US 8,554,727 B2
(45) Date of Patent: Oct. 8, 2013

(54) METHOD AND SYSTEM OF TIERED QUIESCING

(75) Inventor: Rajeev Atluri, Corona, CA (US)

(73) Assignee: Inmage Systems, Inc., Santa Clara, CA (US)

( * ) Notice: Subject to any disclaimer, the term of this patent is extended or adjusted under 35 U.S.C. 154(b) by 770 days.

(21) Appl. No.: 11/437,464

(22) Filed: May 19, 2006

(65) Prior Publication Data

US 2007/0271304 A1 Nov. 22, 2007

(51) Int. Cl.
*G06F 7/02* (2006.01)
*G06F 17/30* (2006.01)

(52) U.S. Cl.
USPC .......................................... 707/615; 707/613

(58) Field of Classification Search
USPC ........... 707/2, 200, 202–204, 999.002, 999.2, 707/999.202, 999.204, 615, 613; 710/20; 709/213
See application file for complete search history.

(56) References Cited

U.S. PATENT DOCUMENTS

| | | | |
|---|---|---|---|
| 5,193,181 A | 3/1993 | Barlow et al. | |
| 5,313,612 A | 5/1994 | Satoh et al. | |
| 5,446,871 A | 8/1995 | Shomler et al. | |
| 5,621,882 A | 4/1997 | Kakuta | |
| 5,664,189 A | 9/1997 | Wilcox et al. | |
| 5,805,785 A | 9/1998 | Dias et al. | |
| 5,875,479 A | 2/1999 | Blount et al. | |
| 5,930,824 A | 7/1999 | Anglin et al. | |
| 6,175,932 B1 | 1/2001 | Foote et al. | |
| 6,247,141 B1 | 6/2001 | Holmberg | |
| 6,269,431 B1 | 7/2001 | Dunham | |
| 6,324,654 B1 | 11/2001 | Wahl et al. | |
| 6,327,579 B1 | 12/2001 | Crawford | |
| 6,490,691 B1 | 12/2002 | Kimura et al. | |
| 6,647,399 B2 | 11/2003 | Zaremba | |
| 6,691,140 B1 | 2/2004 | Bogrett | |
| 6,714,980 B1 | 3/2004 | Markson et al. | |
| 6,742,139 B1 | 5/2004 | Forsman et al. | |
| 6,833,073 B2 | 12/2004 | Agarwal | |
| 6,915,315 B2 | 7/2005 | Autrey et al. | |
| 6,981,177 B2 | 12/2005 | Beattie | |
| 7,093,086 B1 | 8/2006 | Rietschote | |

(Continued)

FOREIGN PATENT DOCUMENTS

WO   WO-2004021677 A1   3/2004

OTHER PUBLICATIONS

U.S. Appl. No. 11/405,236, filed Oct. 18, 2007, Michael et al.
U.S. Appl. No. 11/438,401, filed Dec. 6, 2007, Atluri et al.

(Continued)

*Primary Examiner* — Bruce Moser
(74) *Attorney, Agent, or Firm* — Raj Abhyanker, P.C.

(57) ABSTRACT

A method and system of tiered quiescing is disclosed. In one embodiment, a method includes generating a representation data of a multi-tier network, embedding a flag marker at a transaction event based on at least of an event data and a timing data, and quiescing, based on the representation data, a set of modules of the multi-tier network associated with at least one of the event data and the timing data using the flag marker. The representation data may be generated based on a transaction modeling of data flows between the set of modules of the multi-tier network (e.g., the set of modules may each operate in different tiers of the multi-tier network). In addition, a series of consistency points may be determined based on the transaction modeling of data flows between the sets of modules of the multi-tier network.

14 Claims, 10 Drawing Sheets

(56) References Cited

U.S. PATENT DOCUMENTS

| | | |
|---|---|---|
| 7,155,586 B1 | 12/2006 | Wagner et al. |
| 7,165,156 B1 | 1/2007 | Cameron et al. |
| 7,206,911 B2 | 4/2007 | Wolfgang et al. |
| 7,237,021 B2 | 6/2007 | Penny et al. |
| 7,251,749 B1 | 7/2007 | Fong et al. |
| 7,254,682 B1 | 8/2007 | Arbon |
| 7,325,159 B2 * | 1/2008 | Stager et al. .................... 714/13 |
| 7,426,559 B2 * | 9/2008 | Hamel et al. ................. 709/225 |
| 2002/0008795 A1 | 1/2002 | Koyama et al. |
| 2002/0124013 A1 | 9/2002 | Loy et al. |
| 2003/0093579 A1 | 5/2003 | Zimmer et al. |
| 2004/0031030 A1 | 2/2004 | Kidder et al. |
| 2004/0093474 A1 | 5/2004 | Lin et al. |
| 2004/0199515 A1 | 10/2004 | Penny et al. |
| 2004/0205390 A1 | 10/2004 | Kanevsky et al. |
| 2005/0010835 A1 | 1/2005 | Childs et al. |
| 2005/0033930 A1 | 2/2005 | Haruma et al. |
| 2005/0044162 A1 | 2/2005 | Liang et al. |
| 2005/0050386 A1 | 3/2005 | Reinhardt et al. |
| 2005/0055603 A1 | 3/2005 | Soran et al. |
| 2005/0138090 A1 | 6/2005 | Augenstein et al. |
| 2005/0138204 A1 | 6/2005 | Iyer et al. |
| 2005/0182953 A1 | 8/2005 | Stager et al. |
| 2005/0188256 A1 | 8/2005 | Stager et al. |
| 2005/0198303 A1 | 9/2005 | Knauerhase et al. |
| 2005/0223181 A1 | 10/2005 | Jeppsen et al. |
| 2005/0240792 A1 | 10/2005 | Sicola et al. |
| 2005/0251540 A1 | 11/2005 | Sim-Tang |
| 2005/0257085 A1 | 11/2005 | Haustein et al. |
| 2005/0262097 A1 | 11/2005 | Sim-Tang et al. |
| 2005/0262377 A1 | 11/2005 | Sim-Tang |
| 2005/0267920 A1 | 12/2005 | Helliker et al. |
| 2006/0031468 A1 | 2/2006 | Atluri et al. |
| 2006/0047714 A1 | 3/2006 | Anderson et al. |
| 2006/0114497 A1 | 6/2006 | Anderson et al. |
| 2006/0149793 A1 | 7/2006 | Kushwah et al. |
| 2006/0155912 A1 | 7/2006 | Singh et al. |
| 2006/0218434 A1 | 9/2006 | Solhjell |
| 2007/0038998 A1 | 2/2007 | Fries |
| 2007/0168404 A1 | 7/2007 | Nakamura et al. |
| 2007/0220309 A1 * | 9/2007 | Andre et al. ...................... 714/6 |
| 2007/0244938 A1 | 10/2007 | Michael et al. |

OTHER PUBLICATIONS

U.S. Appl. No. 11/438,036, filed Nov. 22, 2007, Atluri.

U.S. Appl. No. 11/229,289, filed Jan. 12, 2006, Atluri.

Data Protection—Perform Zero Downtime Backups [online Jan. 29, 2009]. Retrieved from the Internet URL: http://stage.hp.resource.com/sbso/bus_protect/data_protect/zero_downtime.

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL: http://www.rmwtug.org/Talks/ShadowStor/ShadowProtectdsheet.pdf.

* cited by examiner

| APPLICATION 402 | APPLICATION DEPENDENT EVENTS 404 | PACKAGED EVENTS 406 | USER DEFINED EVENTS 408 | INTERVAL TIMING EVENTS 410 | USER SPECIFIED TIMING EVENTS 412 |
|---|---|---|---|---|---|
| BANK – WELLS FARGO | EVERY 10 TELLER TRAN TRANSACTIONS/ EVERY 5 ATM TRASACTIONS | ANY TRANSACTION AMOUNT > $ 5,000 | INVALID ATM CARD USED, INVALID PIN USED | EVERY MINUTE | 3 PM, 6 PM |
| ONLINE AUCTION SYSTEM – EBAY | EVERY 5 SALES COMPLETED, EVERY 5 PURCHASES COMPLETED | ANY TRANSACTION AMOUNT > $ 1,000 | FAILED LOGIN ATTEMPTS | EVERY 5 MINUTES | 8 AM, 8 PM |
| ○ | ○ | ○ | ○ | ○ | ○ |
| ○ | ○ | ○ | ○ | ○ | ○ |
| ○ | ○ | ○ | ○ | ○ | ○ |

| SYSTEM ADMINISTRATOR MODULE 112 | TIER 1 100 MODULE | TIER 2 102 MODULE | TIER N 104 MODULE | BACKUP SYNCHRONIZATION MODULE 106 | DATABASE MODULE 108 |
|---|---|---|---|---|---|
| | | | | MODELS TIER DEPENDENCIES BY MONITORING TRANSACTION FLOW 500 | |
| | | | | GENERATES AND PROCESSES USER DEFINED EVENTS 502 | |
| | HANDLES END USER REQUEST 504 | | | | |
| | | | | | STORES USER DEFINED EVENTS 506 |
| | | PROCESSES TRANSACTION INFORMATION 508 | | | |
| | | | MAINTAINS TRANSACTIONAL INFORMATION 510 | | |
| | | | | GENERATE APPLICATION SPECIFIC EVENTS 512 | |
| | | | | | STORE APPLICATION SPECIFIC EVENTS 514 |
| | | | | DETECTS OCCURENCE OF BACKUP TRIGGERING EVENTS 516 | |
| | | | | | COMMUNICATE MATCHING EVENTS TO BACKUP SYNCHRONIZATION MODULE 518 |
| | | | | QUIESCES OPERATION OF RELEVENT TIER (S) 520 | |
| | | | | PERFORMS CDP 522 | |
| GENERATES REQUEST TO COALESCE DATA 524 | | | | | |
| | | | | DETECTS OCCURANCE OF COALESCING TRIGGERING EVENTS 526 | |
| | | | | | COMMUNICATES MATCHING EVENTS TO BACKUP SYNCHRONIZATION MODULE 528 |
| | | | | COALESCES RELEVENT DATA 530 | |
| | | | | DETECTS OCCURANCE OF BOOKMARKING TRIGGERING EVENTS 532 | |
| | | | | | COMMUNICATES MATCHING EVENTS TO BACKUP SYNCHRONIZATION MODULE 534 |
| | | | | CREATES FLAG MARKER POINT 536 | |
| | | | | STORES FLAG MARKER IN DEPOSITORY MODULE 538 | |
| ACCESSES FLAG DEPOSITORY WHEN NEEDED 540 | | | | | |
| SPECIFY RECOVERY POINT 542 | | | | | |
| | | | | AUTOMATICALLY RECOVER TO USER SPECIFIED FLAG 544 | |

FIGURE 5

METHOD AND SYSTEM OF TIERED QUIESCING

FIELD OF TECHNOLOGY

This disclosure relates generally to the technical fields of software and/or hardware technology and, in one example embodiment, to a method and/or system of tiered quiescing.

BACKGROUND

A commerce system (e.g., a banking system, an online auction system, etc.) may perform an operation (e.g., a data storage, a data backup, a data retrieval, a data modification, a data transfer, etc.) on a transaction (e.g., an ATM deposit, an ATM withdrawal, a purchase, a return, an exchange, etc.) at multiple tiers (e.g., a client interface tier, a regional tier, a national tier, etc.) of the commerce system. For example, the transaction (e.g., the ATM deposit) may be initiated by a client at the client interface tier by a first tier module (e.g., an ATM machine) and executed accordingly by the first tier module. The transaction (e.g., the ATM deposit) may then be sent to the regional tier (e.g., a local banking branch) for processing and/or analysis. The transaction (e.g., the ATM deposit) may be sent to the national tier for central storage and/or monitoring.

Given the tiered nature of the commerce system, the transaction (e.g., the ATM deposit, the ATM withdrawal, the purchase, the return, the exchange, etc.) may include a delay between the multiple tiers. Therefore, the data backup and/or storage methods (e.g., a continuous data protection, a snapshot-based protection) performed at each tier may introduce a data inconsistency (e.g., a duplicate data, a missing data, etc.). Moreover, in an event of a system failure (e.g., a system crash, a power outage, etc.), a data state may be lost after the system failure. In addition, the data state right before the system failure may be unreliable (e.g., incomplete, corrupt, etc.).

In a context of the commerce system, the data inconsistency and the inability to restore the data state to a reliable state may be detrimental to the operation of a business (e.g., the data storage, the data backup, the data retrieval, the data modification, the data transfer, etc.). For example, if for auditing reasons a specific business transaction (e.g., the ATM deposit, the ATM withdrawal, the purchase, the return, the exchange, etc.) needs to be retrieved, a specific business transaction getting lost during the data backup and/or storage processes may result in incorrect bank account values, upset customers, and more. Having a duplicate data may result in data storage inefficiencies because of added costs and storage requirements.

Continuous data protection may be initiated when a change is made to the transaction. Therefore, continuous data protection may also result in data storage inefficiencies due to a large volume of changes that are being stored. The large volume of changes may also make it difficult to locate the specific business transaction (e.g., the ATM deposit, the ATM withdrawal, the purchase, the return, the exchange, etc.) and/or a particular change associated with an occurrence of a specific event (e.g., midnight, every 5 minutes, system crash, configuration change, failed log-in, etc.). As such, an expensive amount of resource overhead (e.g., storage space, time, manpower, money) in the commerce system may be required to provide adequate service levels.

SUMMARY

A method and system of tiered quiescing is disclosed. In one aspect, a method includes generating a representation data of a multi-tier network, embedding a flag marker at a transaction event based on an event data and/or a timing data, and quiescing, based on the representation data, a set of modules of the multi-tier network associated with the event data and/or the timing data using the flag marker. The representation data may be generated based on a transaction modeling of data flows between the set of modules of the multi-tier network (e.g., the set of modules may each operate in different tiers of the multi-tier network). The method may be performed on a controller board of a storage sub-system coupled to the multi-tier network.

In addition, a series of consistency points may be determined based on the transaction modeling of data flows between the sets of modules of the multi-tier network. In addition, a data backup operation (e.g., may be a partial back-up of a storage volume and/or device as opposed to an entire backup) may be automatically performed based on an occurrence of an event associated with the multi-tier network. Also, a timing consistency algorithm may be performed along with the data backup operation to ensure data integrity. The event may be any of a time dependent event and a time-independent event (e.g., an application dependent event, a packaged event, and/or a user defined event).

A set of data at intervals adjacent to the event may be coalesced based on a policy data provided through a backup synchronization module. In addition, the flag marker may be associated with an automatic data recovery operation, a data rollback operation, a file rollback operation, and/or a volume rollback operation.

In another aspect, a network includes a first tier module to process a data based on a client communication with the first tier module, an intermediary tier module to communicate with the first tier module and other modules and to aggregate data of the first tier and/or an nth tier module having an ability to temporarily disable the first tier module and the intermediary tier module based on an event data and/or a timing data. A sequence of the temporary disablement may be governed by a modeling of a transaction between the first tier module, the intermediary tier module, and/or the nth tier module. In addition, the ability of the nth tier module may be enabled through a backup synchronization module associated with the nth tier module.

The backup synchronization module may automatically perform a data backup operation of the first tier module (e.g., may be a partial back-up of a storage volume and/or device as opposed to an entire backup), the intermediary tier module, and/or the nth tier module when an event (e.g., an application dependent event, a packaged event, and/or a user defined event) associated with the multi-tier network is detected. Furthermore, the backup synchronization module may perform a timing consistency algorithm along with the data backup operation to ensure data consistency. Also, the backup synchronization module may coalesce a set of data at intervals adjacent to the event based on a policy data.

In yet another aspect, a method of a multi-tier network may include disabling an operation of a tier module (e.g., the tier 1 module 100, the tier 2 module 102, the tier N module 104, etc.) based on an event data and/or a timing data of a backup synchronization module, communicating a present-state data from the tier module (e.g., the tier 1 module 100, the tier 2 module 102, the tier N module 104, etc.) to a storage sub-system based on the event data and/or the timing data, and enabling the operation of the tier module (e.g., the tier 1 module 100, the tier 2 module 102, the tier N module 104, etc.) based on a completion data of the backup synchronization module when the backup synchronization module has processed the present-state data and/or other data of different modules of the multi-tier network. The method may restore the present-state data at a consistency point when a recovery operation is performed on the tier module (e.g., the tier 1 module 100, the tier 2 module 102, the tier N module 104, etc.) after a failure of the tier module (e.g., the tier 1 module 100, the tier 2 module 102, the tier N module 104, etc.). The consistency point may be determined algorithmically by the backup synchronization module. In addition, the backup synchronization module may be located in a controller of a storage sub-system coupled to the multi-tier network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of content referenced by the database module of FIG. 3, according to one embodiment.

FIG. 5 is an interaction diagram of a process flow between the system administrator module, the tier 1 module, the tier 2 module, the tier N module, the backup synchronization module, and the database module, according to one embodiment.

Figure 1:
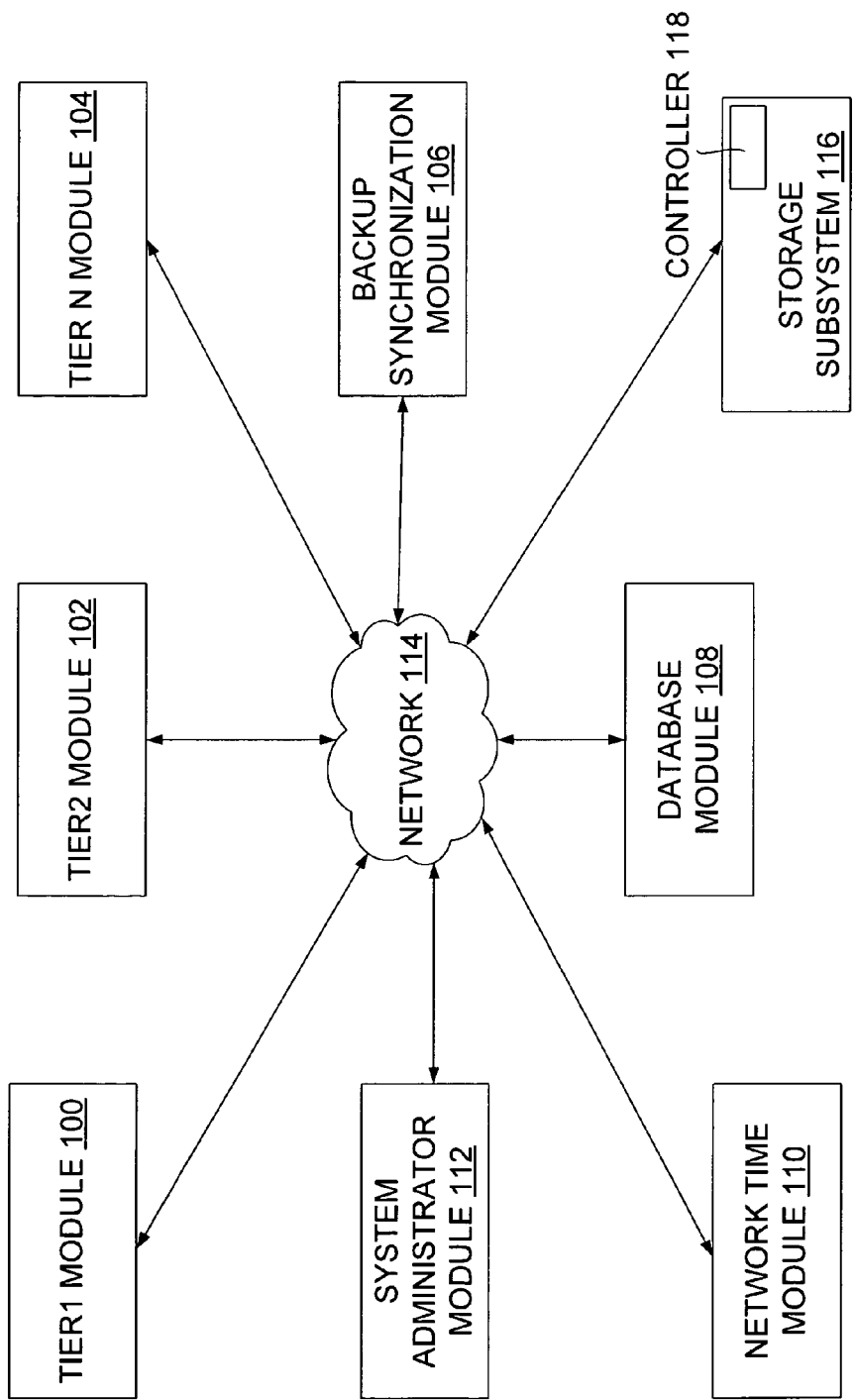
FIG. 1 is a system view of a backup synchronization module that communicates with a tier 1 module, a tier 2 module, a tier N module, a system administrator module, a network time module, a database module, and/or a storage sub-system sub-system through a network, according to one embodiment.

Other features of the present embodiments will be apparent from the accompanying drawings and from the detailed description that follows.

DETAILED DESCRIPTION

A method and system of tiered quiescing is disclosed. In the following description, for the purposes of explanation, numerous specific details are set forth in order to provide a thorough understanding of the various embodiments. It will be evident, however to one skilled in the art that the various embodiments may be practiced without these specific details.

An example embodiment provides methods and systems to generate a representation data (e.g., a model, a business prototype, a data flow chart, etc.) of a multi-tier network (e.g., a banking system, an online auction system, etc.) to embed a flag marker (e.g., a bookmark, a label, etc.) at a transaction event (e.g., an ATM deposit, an ATM withdrawal, a purchase, a return, an exchange, etc.) based on an event data (e.g., system crash, configuration change, failed log-in, etc.) and/or a timing data (e.g., midnight, every 5 minutes, etc.), and quiescing (e.g., pausing, stopping, disabling, etc.), based on the representation data (e.g., a model, a business prototype, a data flow chart, etc.), a set of modules of the multi-tier network (e.g., a banking system, an online auction system, etc.) associated with the event data (e.g., system crash, configuration change, failed log-in, etc.) and/or the timing data (e.g., midnight, every 5 minutes, etc.), and/or quiescing (e.g., pausing, stopping, disabling, etc.) using the flag marker (e.g., a bookmark, a label, etc.).

Another example embodiment provides methods and systems to process a data based on a client communication with the first tier module, communicate with the first tier module (e.g., a client interface tier module, etc.) and other modules (e.g., a regional tier module, a national tier module, etc.) and to aggregate data of at least one module of the first tier (e.g., a client interface tier module, etc.), and/or have an ability to disable the first tier module (e.g., a client interface tier module, etc.) and the intermediary tier module (e.g., a regional tier module, a national tier module, etc.) based on an event data (e.g., system crash, configuration change, failed log-in, etc.) and/or a timing data (e.g., midnight, every 5 minutes, etc.).

A further example embodiment provides methods and systems to disable an operation of tier module (e.g., the tier 1 module 100, the tier 2 module 102, the tier N module 104, etc.) based on an event data (e.g., system crash, configuration change, failed log-in, etc.) and/or a timing data (e.g., midnight, every 5 minutes, etc.) of a backup synchronization module, communicate a present-state data from tier module (e.g., the tier 1 module 100, the tier 2 module 102, and/or the tier N module 104, etc.) to a storage sub-system (e.g., an optical hard disk drive, a magnetic hard disk drive, a floppy disk, a compact-disk, an external hard disk drive, and/or a flash memory drive, etc.) based on the event data (e.g., system crash, configuration change, and/or failed log-in, etc.) and/or the timing data (e.g., midnight, every 5 minutes, etc.), and/or enable the operation of tier module (e.g., the tier 1 module 100, the tier 2 module 102, and/or the tier N module 104, etc.) based on a completion data of the backup synchronization module when the backup synchronization module has processed the present-state data and other data of different modules of the multi-tier network (e.g., a banking system, an online auction system, etc.).

It will be appreciated that the various embodiments discussed herein may/may not be the same embodiment, and may be grouped into various other embodiments not explicitly disclosed herein.

FIG. 1 is a system view of a backup synchronization module that communicates with a tier 1 module 100, a tier 2 module 102, a tier N module 104, a system administrator module 112, a network time module 110, a database module 108, and/or a storage sub-system 116 having a controller 118 through a network 114 (e.g., Wide-Area-Network, Internet, etc.), according to one embodiment.

In another embodiment, a tier module (e.g., the tier 1 module 100, the tier 2 module 102, and/or the tier N module 104, etc.) may disable an operation (e.g., a data storage, a data backup, a data retrieval, a data modification, and/or a data transfer, etc.) of the tier module (e.g., the tier 1 module 100, the tier 2 module 102, and/or the tier N module 104, etc.) based on an event data (e.g., system crash, configuration change, failed log-in, etc.) and/or a timing data (e.g., midnight, every 5 minutes, etc.) of the backup synchronization module 106. In another embodiment, the tier module (e.g., the tier 1 module 100, the tier 2 module 102, and/or the tier N module 104, etc.) may communicate a present state data from the tier module (e.g., the tier 1 module 100, the tier 2 module 102, and/or the tier N module 104, etc.) to a storage device (e.g., the storage sub-system 116) based on the event data (e.g., system crash, configuration change, failed log-in, etc.) and/or the timing data (e.g., midnight, every 5 minutes, etc.).

In yet another embodiment, the tier module (e.g., the tier 1 module 100, the tier 2 module 102, and/or the tier N module 104, etc.) may enable the operation (e.g., a data storage, a data backup, a data retrieval, a data modification, and/or a data transfer, etc.) of the tier module (e.g., the tier 1 module 100, the tier 2 module 102, and/or the tier N module 104, etc.) based on a completion data of the backup synchronization module 106 when the backup synchronization module 106 has processed the present-state data and other data of different modules (e.g., the tier 1 module 100, the tier 2 module 102, and/or the tier N module 104, etc.) of the multi-tier network (e.g., a banking system, an online auction system, etc.).

The tier 1 module 100 may process a data based on a client request and transmit the data to the tier 2 module 102 and/or the tier N module 104. A set of modules, the tier 1 module 100, the tier 2 module 102, and/or the tier N module 104 may operate in different tiers of the multi-tier network (e.g., a banking system, an online auction system, etc.). In one embodiment, the first tier module 100 may process a data based on a client communication with the first tier module 100.

The tier 2 module 102 may process the data transmitted from a number of devices in the tier 1 module 100 and perform an operation on the data. The tier 2 module 104 may then transmit the data to the tier N module 104 through the network 114. In one embodiment, an intermediary tier module (e.g., the second tier module 102) may communicate with the first tier module 100 and other modules (e.g., the tier N module 104) and to aggregate data of at least one module of the first tier.

The tier N module 104 may perform the operation (e.g., a data storage, a data backup, a data retrieval, a data modification, a data transfer, etc.) on the data transmitted from the tier 1 module 100 and the tier 2 module 102 by temporarily disabling the first tier module (e.g., the tier 1 module 100) and the intermediary tier module (e.g., the tier 2 module 102). In one embodiment, the tier N module 104 may have the ability to temporarily disable the first tier module (e.g., the tier 1 module 100) and the intermediary tier module (e.g., the tier 2 module 102) based on the event data (e.g., system crash, configuration change, and/or failed log-in, etc.) and/or the timing data (e.g., midnight, every 5 minutes, etc.). The ability of the tier N module 104 to temporarily disable the first tier module (e.g., the tier 1 module 100) and the intermediary tier module (e.g., the tier 2 module 102) is enabled through the backup synchronization module 106 associated with the tier N module 104.

The backup synchronization module 106 may interact with the tier 1 module 100, the tier 2 module 102, the tier N module 104, the storage sub-system 116, the database module 108, the network time module 110, and/or the system administrator module 112 to facilitate a backup of a data transmitted in the multi-tier network (e.g., a banking system, an online auction system, etc.). In one embodiment, the backup synchronization module 106 may automatically perform a data backup operation of the tier 1 module 100, the tier 2 module 102, and/or the tier N module 104 when an event associated with the multi-tier network is detected (e.g., may be a partial back-up of a storage volume and/or device as opposed to an entire backup). In another embodiment, the backup synchronization module may perform a timing consistency algorithm along with the data backup operation to ensure data consistency. In yet another embodiment, the backup synchronization module 106 may coalesce a set of data at intervals adjacent to the event based on a policy data.

The database module 108 may track and/or store data related to the event data (e.g., system crash, configuration change, and/or failed log-in, etc.) and the timing data (e.g., midnight, every 5 minutes, etc.). The backup synchronization module 106 may communicate with the database module 108 to recognize an occurrence of an event.

The network time module 110 may communicate with the tier 1 module 100, the tier 2 module 102, the tier N module 104, the backup synchronization module 106, the storage sub-system 116, the database module, and/or the system administrator module 112 through the network 114 to ensure each module is operating based on a common time source.

The system administrator module 112 may facilitate and/or generate a coalescing, a flag access, and/or a recovery request from a system administrator to the backup synchronization module 108.

The storage sub-system 116 having the controller 118 may communicate with the tier modules (e.g., the tier 1 module 100, the tier 2 module 102, and/or the tier N module 104, etc.) to store a data. In one embodiment, the backup synchronization module 106 may be located in the controller 118 of the storage sub-system 116. In another embodiment, a function of the backup synchronization module 106 may be performed on the controller 118 of the storage sub-system 116.

Figure 2:
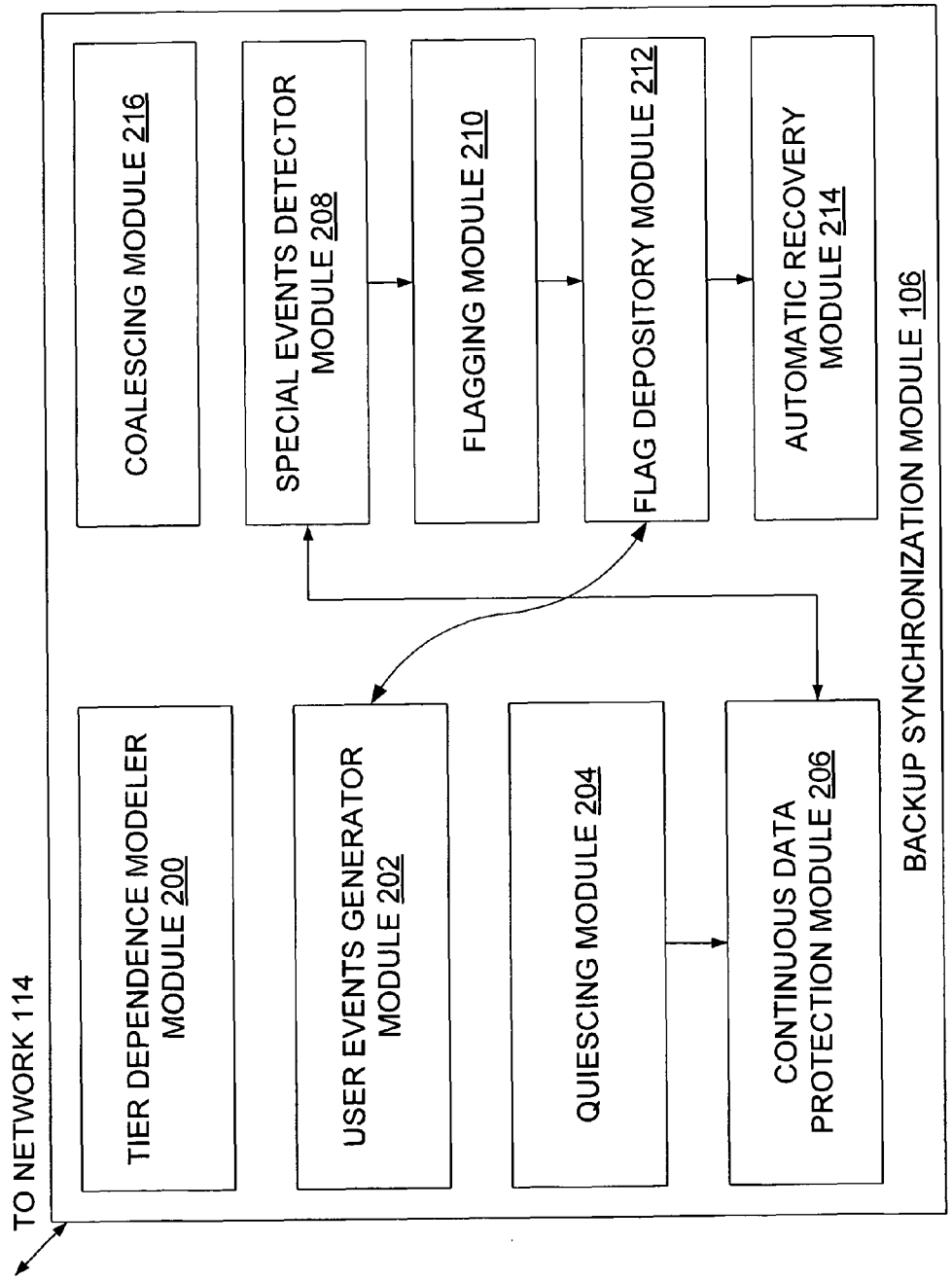
FIG. 2 is an exploded view of the backup synchronization module of FIG. 1 having a tier dependence modeler module, a user events generator module, a quiescing module, a continuous data protection module, a coalescing module, a special events detector module, a flagging module, a flag depository module, and/or an automatic recovery module, according to one embodiment.

FIG. 2 is an exploded view of the backup synchronization module 106 of FIG. 1 having a tier dependence modeler module 200, a user events generator module 202, a quiescing module 204, a continuous data protection module 206, a coalescing module 216, a special events detector module 208, a flagging module 210, a flag depository module 212, and/or an automatic recovery module 214, according to one embodiment.

The tier dependence modeler module 200 may communicate with the multi-tier network (e.g., a banking system, an online auction system, etc.) to determine an interaction model. For example, the tier dependence modeler module 200 may generate a representation data (e.g., a model, a business prototype, a data flow chart, etc.) of a multi-tier network (e.g., a banking system, an online auction system, etc.) based on a transactional modeling of data flow between the set of modules (e.g., the tier 1 module 100, the tier 2 module 102, the tier N module 104, etc.) of the multi-tier network (e.g., a banking system, an online auction system, etc.). In another embodiment, the tier dependence modeler module 200 may determine a series of consistency points based on the transactional modeling of data flows between the set of modules (e.g., the tier 1 module 100, the tier 2 module 102, the tier N module 104, etc.) of the multi-tier network (e.g., a banking system, an online auction system, etc.).

The user events generator module 202 may facilitate communication between a user and the flag depository module 212 to present all possible recovery points in case of a system failure (e.g., a system crash, a power outage, etc.). The user events generator module 202 may also communicate with the database module 106 of FIG. 1 to facilitate communication between the user and the database module 106 to define a user defined event.

The quiescing module 204 may coordinate with the continuous data protection module 206 to perform a data backup operation. For example, the quiescing module 204 may quiesce, based on the representation data (e.g., a model, a business prototype, a data flow chart, etc.), a set of modules (e.g., the tier 1 module 100, the tier 2 module 102, and/or the tier N module 104, etc.) of the multi-tier network (e.g., a banking system, an online auction system, etc.) associated with the event data (e.g., system crash, configuration change, failed log-in, etc.) and/or the timing data (e.g., midnight, every 5 minutes, etc.). According to one embodiment, the quiescing module 204 may perform a timing consistency algorithm along with the data backup operation to ensure data integrity. In another embodiment, the quiescing module 204 may govern a sequence of the temporary disablement between the first tier module (e.g., the tier 1 module 100 of FIG. 1), the intermediary tier module (e.g., the tier 2 module 102 of FIG. 1), and the n-th tier module (e.g., the tier N module 104 of FIG. 1). For example, the quiescing module 204 may disable an operation of tier module (e.g., the tier 1 module 100, the tier 2 module 102, the tier N module 104, etc.) based on an event data (e.g., system crash, configuration change, failed log-in, etc.) and/or a timing data (e.g., midnight, every 5 minutes, etc.).

The continuous data protection module 206 may communicate with the quiescing module 204 and/or the special events detector module 208 to automatically perform the data backup operation in a manner that ensures data consistency. In one embodiment, the continuous data protection module 206 may automatically perform a data backup operation based on an occurrence of an event (e.g., midnight, every 5 minutes, system crash, configuration change, failed log-in, etc.) associated with the multi-tier network (e.g., a banking system, an online auction system, etc.).

The special events detector module 208 may detect and/or recognize the occurrence of an event (e.g., midnight, every 5 minutes, system crash, configuration change, failed log-in, etc.) associated with the multi-tier network (e.g., a banking system, an online auction system, etc.) by communicating with the database module 106 of FIG. 1. For example, the occurrence of the event (e.g., midnight, every 5 minutes, system crash, configuration change, failed log-in, etc.) may be communicated to the quiescing module 204 and/or the continuous data protection module 206 to initiate a sequence of temporary disablement of the multi-tier network (e.g., a banking system, an online auction system, etc.) and/or to automatically perform a data backup operation.

The flagging module 210 may communicate with the special events detector module 208 and/or the flag depository module 212 to create a flag marker (e.g., a bookmark, a label, etc.) associated with a data state corresponding to the occurrence of an event detected by the special events detector module 208. The flagging module 210 may store a collection of flag markers created in the flag depository module 212. In one embodiment, the flagging module 210 may embed a flag marker at a transaction event based on an event data (e.g., system crash, configuration change, failed log-in, etc.) and/or a timing data (e.g., midnight, every 5 minutes, etc.).

The flag depository module 212 may process the flag markers (e.g., a bookmark, a label, etc.) created by the flagging module 210. In one embodiment, the flag markers (e.g., a bookmark, a label, etc.) in the flag depository module 212 may be associated with an automatic data recovery operation, a data rollback operation, a file rollback operation, and/or a volume rollback operation.

The automatic recovery module 214 may communicate with the flag depository module 212 to determine a point of data recovery associated with the occurrence of an event (e.g., midnight, every 5 minutes, system crash, configuration change, failed log-in, etc.). For example, the automatic recovery module 214 may restore the present-state data at a consistency point (e.g., a flag marker (e.g., a bookmark, a label, etc.) stored in the flag depository module 212) when a recovery operation is performed on tier module (e.g., the tier 1 module 100, the tier 2 module 102, the tier N module 104, etc.) after a system failure (e.g., a system crash, a power outage, etc.) of tier module (e.g., the tier 1 module 100, the tier 2 module 102, the tier N module 104, etc.).

The coalescing module 216 may process a request to coalesce backed up data generated by a user through the system administrator module 112 of FIG. 1. The coalescing module may also communicate with the special events detector module 208 to collapse backed up data based on the occurrence of an event detected by the special events detector 208. In one embodiment, the coalescing module 216 may coalesce a set of data at intervals adjacent to the event (e.g., midnight, every 5 minutes, system crash, configuration change, failed log-in, etc.) based on a policy data provided through the backup synchronization module 106 of FIG. 1.

Figure 3:
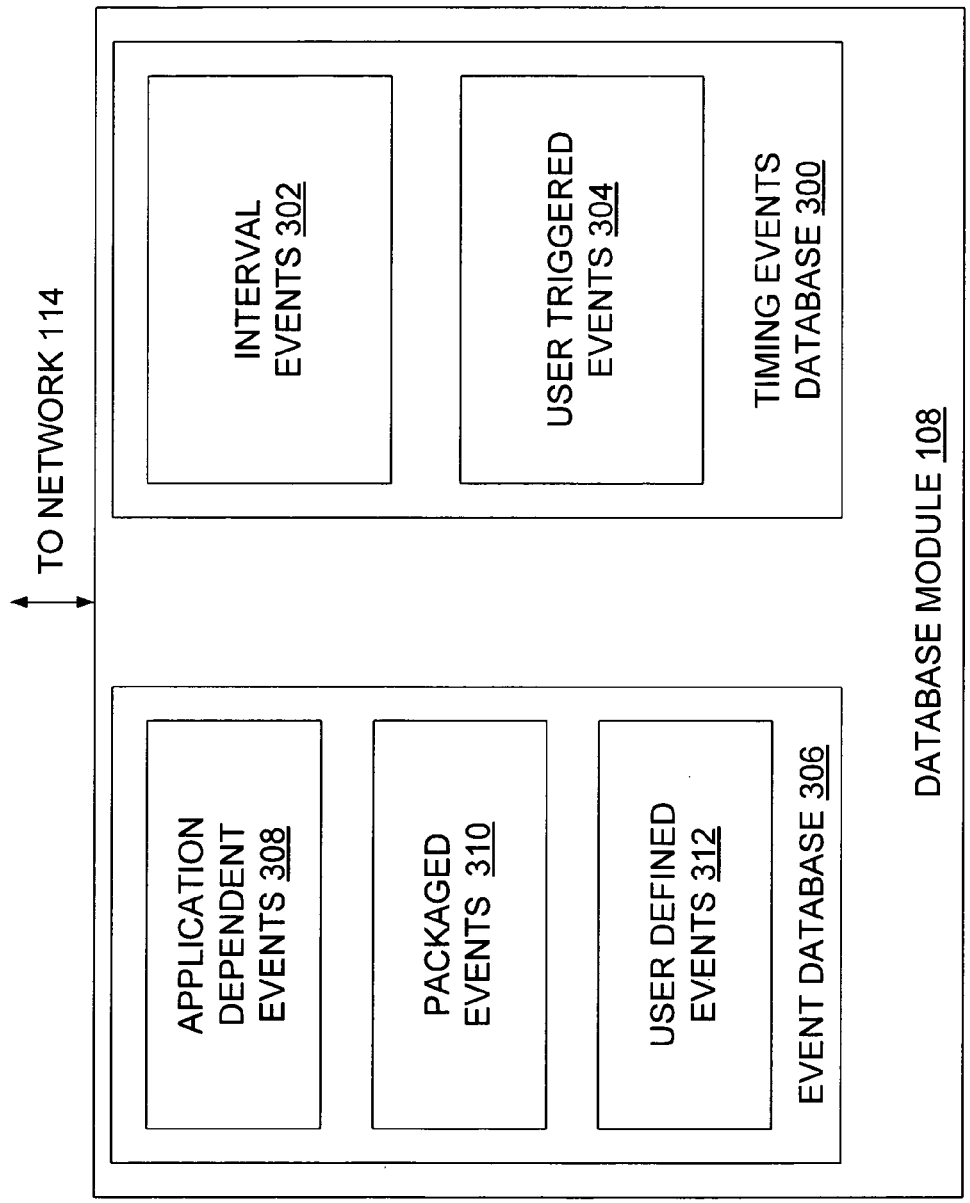
FIG. 3 is an exploded view of the database module of FIG. 1 having an event database and a timing events database with the event database, according to one embodiment.

FIG. 3 is an exploded view of the database module 108 of FIG. 1, according to one embodiment. The database module 108 may include an event database 306 and a timing events database 300 with the event database 306 having application dependent events 308, packaged events 310, and/or user defined events 312 and the timing events database 300 having interval events and/or user triggered events 304. The event database 306 and the timing events database 300 may be accessed by the special events detector module 208 of FIG. 2 to trigger an operation (e.g., a data storage, a data backup, a data retrieval, a data modification, a data transfer, etc.) when any of the events (e.g., midnight, every 5 minutes, system crash, configuration change, failed log-in, etc.) in the event database 306 and/or the timing events database 300 is detected.

The event database 306 may store all of an event data (e.g., crash, configuration change, failed log-in, etc.). In one embodiment, the events may be application dependent events 308, packaged events 310, and/or user defined events 312. The timing database 300 may store all of a timing data (e.g., midnight, every 5 minutes, etc.). For example, the timing database may include interval events 302, and/or user triggered events 304.

FIG. 4 is a table view of content referenced by the database module 108 of FIG. 3, according to one embodiment. The table 400 may include an application field 402, an application dependent events field 404, a packaged events field 406, a user defined events field 408, an interval timing events field 410, and/or an user specified timing events field 412.

The application field 402 may be a name and/or an identification tag associated with a multi-tier network. The application dependent events field 404 may indicate a modeled event of the multi-tier network (e.g., a banking system, an online auction system, etc.) as determined by the dependence modeler module 200 of FIG. 2. The packaged events field 406 may indicate a prepackaged event (e.g., midnight, every 5 minutes, system crash, configuration change, failed log-in, etc.) associated with the multi-tier network (e.g., a banking system, an online auction system, etc.). The user defined events field 408 may indicate an event that is specified by a user in the multi-tier network (e.g., a banking system, an online auction system, etc.). The interval timing events field 410 may indicate a time interval as specified by default (e.g., midnight, every 5 minutes, etc.) at which a data backup may be performed in the multi-tier network (e.g., a banking system, an online auction system, etc.). The user specified timing events field 412 may indicate a time interval as specified by the user (e.g., midnight, every 5 minutes, etc.) in the multi-tier network (e.g., a banking system, an online auction system, etc.).

For example, two multi-tier networks are illustrated in FIG. 4 (e.g., Wells Fargo Bank and EBay Online Auction System). The multi-tier network 'Wells Fargo Bank' has an application dependent events field 'EVERY 10 TELLER TRANSACTIONS/EVERY 5 ATM TRANSACTIONS' indicating every ten teller transactions and/or every 5 ATM transactions constitutes an application dependent event, a packaged events field 'ANY TRANSACTION AMOUNT>$5,000' indicating that any transaction amount>$5,000 constitutes a packaged event, a user defined events field 'INVALID ATM CARD USED, INVALID PIN USED' indicating the user of the multi-tier network 'Wells Fargo Bank' has specified an invalid ATM card usage and/or an invalid PIN usage to an event. In addition, the interval timing events field value 'EVERY MINUTE' indicating a duration of a minute is an event and the user specified timing events field value '3 PM, 6 PM' indicating that the user of the multi-tier network 'Wells Fargo Bank' has specified time events at 3 PM and/or 6 PM.

The multi-tier network 'EBay Online Auction System' has an application dependent events field 'EVERY 5 SALES COMPLETED/EVERY 5 PURCHASES COMPLETED' indicating every give complete sales and/or every five complete purchases constitute an application dependent event, a packaged events field 'ANY TRANSACTION AMOUNT>$1,000' indicating that any transaction amount>$1,000 constitutes a packaged event, a user defined events field 'FAILED LOGIN ATTEMPTS' indicating the user of the multi-tier network 'EBay Online Auction System' has specified an invalid ATM card usage and/or an invalid PIN usage to an event. In addition, the interval timing events field value 'EVERY 5 MINUTES indicating a duration of five minutes is an event and the user specified timing events field value '8 AM, 8 PM' indicating that the user of the multi-tier network 'EBay Online Auction System' has specified time events at 8 AM and/or 8 PM.

FIG. 5 is an interaction diagram of a process flow between the system administrator module 112, the tier 1 module 100, the tier 2 module 102, the tier N module 104, the backup synchronization module 106, and the database module 108 of FIG. 1, according to one embodiment.

In operation 500, the backup synchronization module 106 of FIG. 1 modeled the tier dependencies by monitoring transaction flow. In operation 502, the backup synchronization module 106 of FIG. 1 generated and processed the user defined events. In operation 504, the tier 1 module 100 of FIG. 1 handled an end user request. In operation 506, the database module 108 of FIG. 1 stored all events from a tier modeling and/or from a user definition. In operation 508, the tier 2 module 102 of FIG. 1 processed transactional information transmitted from the tier 1 module 100 of FIG. 1. In operation 510, the tier N module of FIG. 1 maintained the transactional information transmitted from the tier 2 module 102 of FIG. 1. In operation 512, the backup synchronization module 106 of FIG. 1 generated application specific events. In operation 514, the database module 108 of FIG. 1 stored all events generated. In operation 516, the backup synchronization module 106 of FIG. 1 detected an occurrence of backup triggering events. In operation 518, the database module 108 of FIG. 1 communicated a match of the backup triggering events to the backup synchronization module 106 of FIG. 1. In operation 520, the backup synchronization module 106 of FIG. 1 quiesced an operation of the relevant tier(s). In operation 522, the backup synchronization module 106 of FIG. 1 performed continuous data protection.

In operation 524, the system administrator module 112 of FIG. 1 generated a request to coalesce data. In operation 526, the backup synchronization module 106 of FIG. 1 detects an occurrence of coalescing triggering events. In operation 528, the database module 108 of FIG. 1 communicated a match of the coalescing triggering events to the backup synchronization module of FIG. 1. In operation 530, the backup synchronization module 106 of FIG. 1 coalesced relevant data. In operation 532, the backup synchronization module 106 of FIG. 1 detected an occurrence of flag triggering events. In operation 534, the database module 108 of FIG. 1 communicated a match of the flag triggering events to the backup synchronization module of FIG. 1. In operation 536, the backup synchronization module 106 of FIG. 1 created a flag marker. In operation 538, the backup synchronization module 106 of FIG. 1 stored the flag marker in the flag depository module 212 of FIG. 2. In operation 540, the system administrator module 112 of FIG. 1 accessed the flag depository module 212. In operation 542, the system administrator module 112 of FIG. 1 specified the recovery point. In operation 544, the backup synchronization module 106 of FIG. 1 automatically recovered the data state to the specified recovery point.

Figure 6:
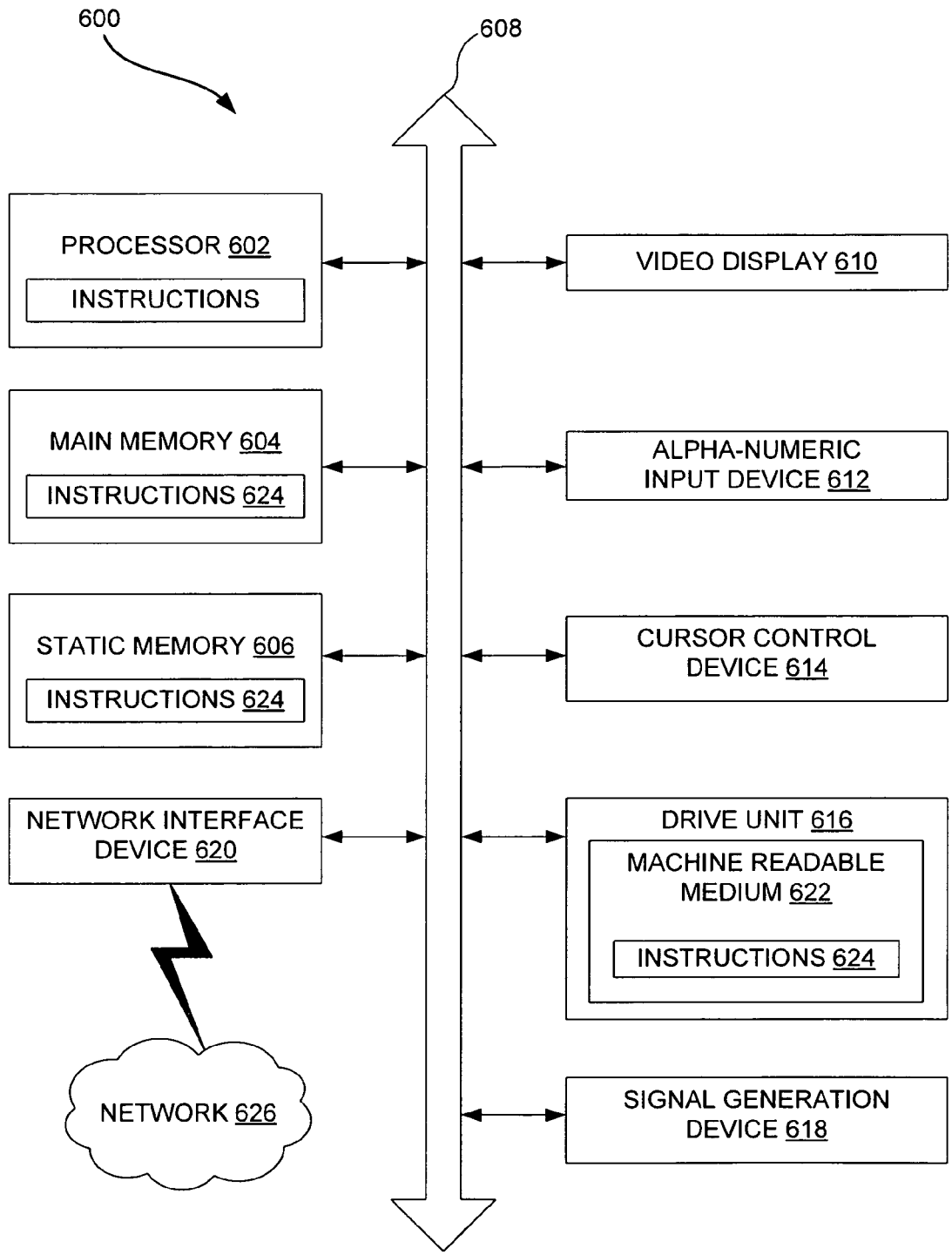
FIG. 6 is a diagrammatic representation of a machine in the form of a data processing system within which a set of instructions, for causing the machine to perform any one or more of the methodologies discussed herein, may be executed, according to one embodiment.

FIG. 6 shows a diagrammatic representation of a machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal display (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 7:
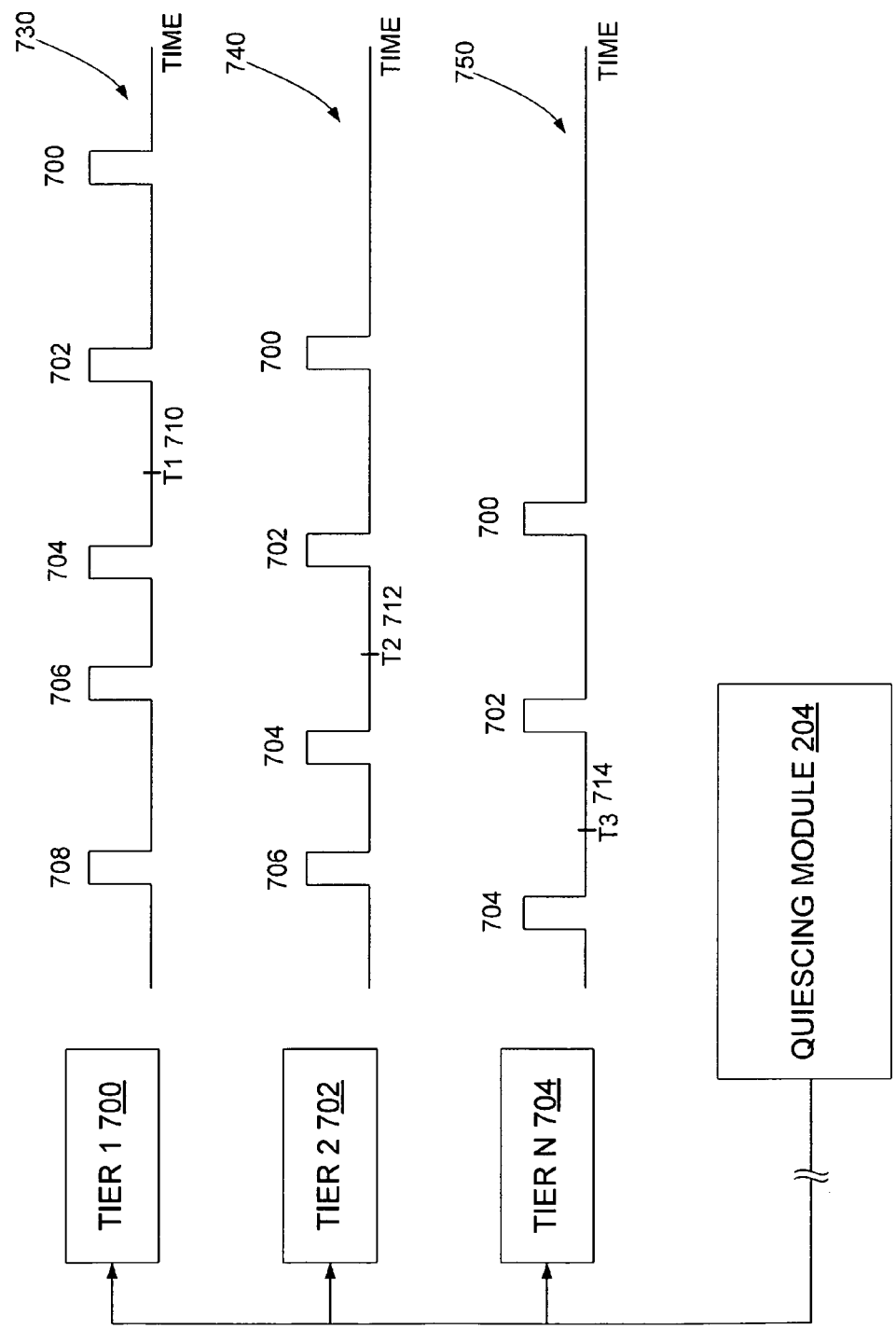
FIG. 7 is a timing diagram to illustrate data flow between tier 1, tier 2, and/or tier N facilitated by the quiescing module of FIG. 2, according to one embodiment.

FIG. 7 is a timing diagram to illustrate data flow between the tier 1 700, the tier 2 702, and/or the tier N 704 facilitated by the quiescing module 204 of FIG. 2, according to one embodiment. A timing chart 730 shows a data flow (e.g., data pulses 700, 702, 704, etc.) at the tier 1 700, a timing chart 740 shows the data flow (e.g., data pulses 700, 702, 704, etc.) at the tier 2 702, a timing chart 750 shows the data flow (e.g., data pulses 700, 702, 704, etc.) at the tier N 704. For example, to backup the data 700 and data 702 reliably, the tier 1 700 is quiesced at a time T1 710, the tier 2 702 is quiesced at a time T2 712, and the tier N 704 is quiesced at a time T3 714.

Figure 8:
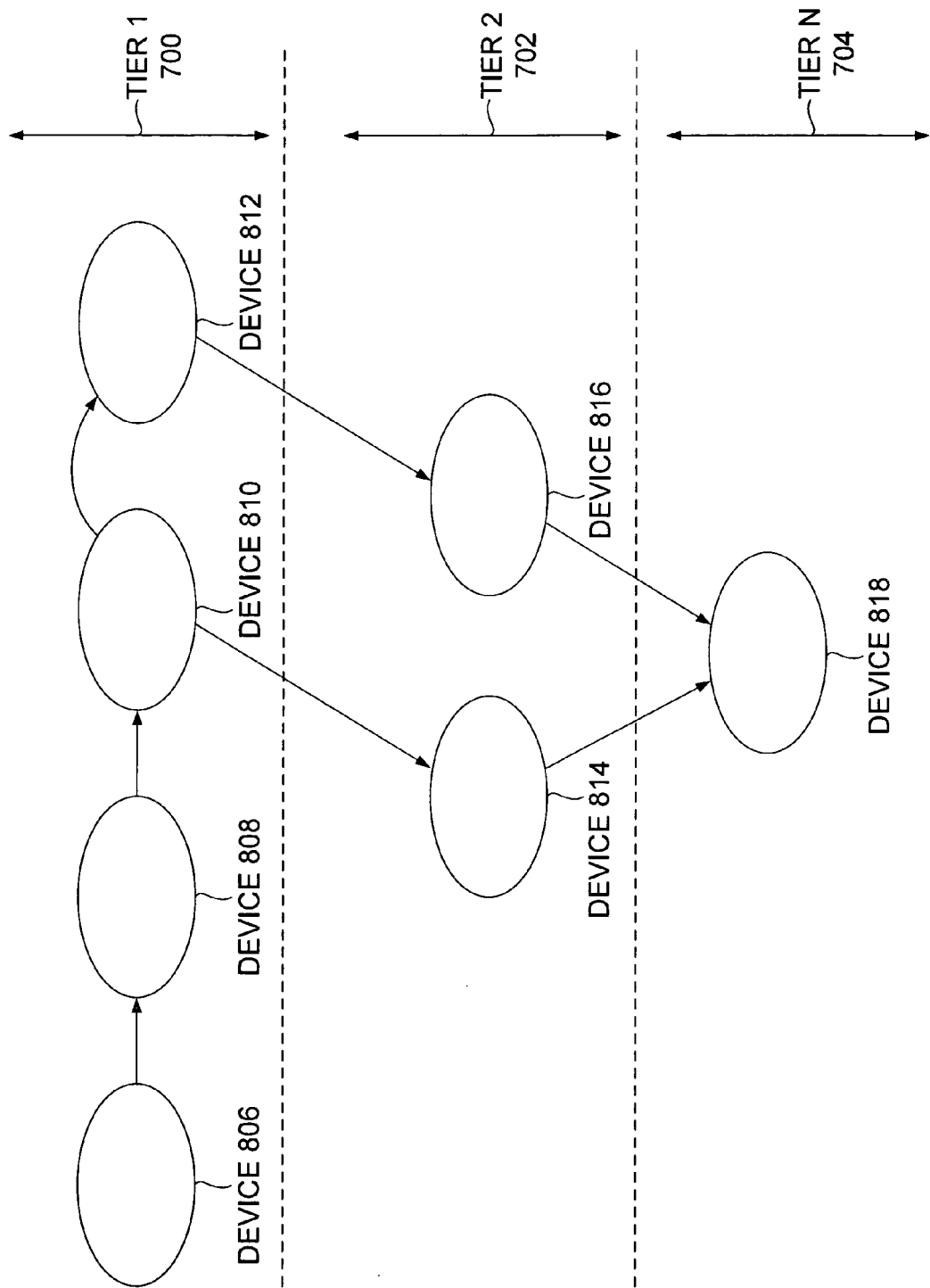
FIG. 8 is an interaction chart showing data communication between multiple devices in tier 1, tier 2, and/or tier N of FIG. 7, according to one embodiment.

FIG. 8 is an interaction chart showing data communication between multiple devices in the tier 1 700, the tier 2 702, and/or the tier N 704 of FIG. 7, according to one embodiment. The tier 1 700 having devices 806, 808, 810, and/or 812. The tier 2 702 having devices 814, and/or 816. The tier 3 704 having a device 818. For example, a data may be transmitted to several devices in the tier 1 700 before it is aggregated and sent to a device in the tier 2 702. The device 818 in the tier N 704 may aggregate data sent from the device 814 and/or device 816.

Figure 9:
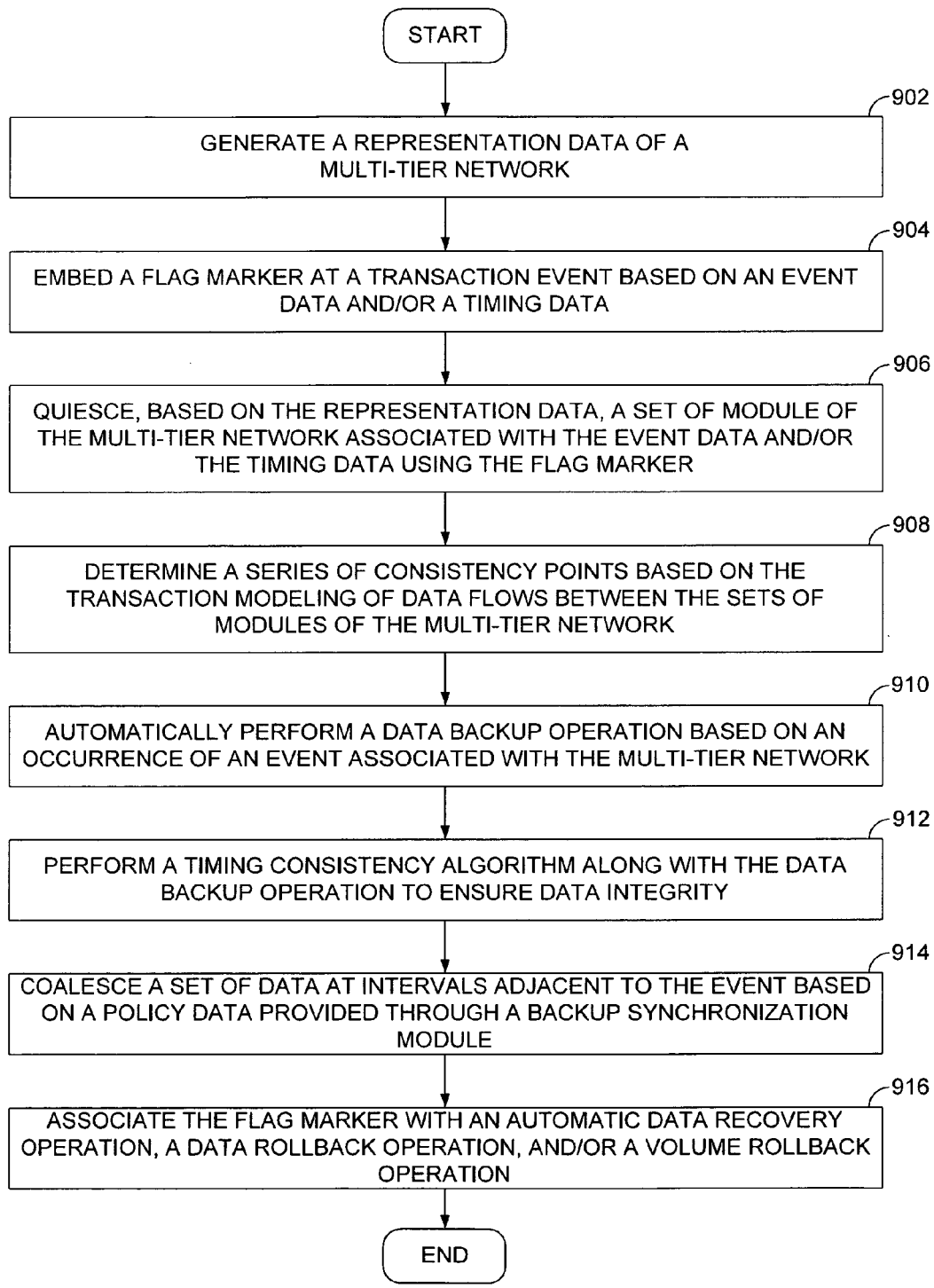
FIG. 9 is a process flow to generate a representation data of a multi-tier network, embed a flag marker at a transaction event based on an event data and/or a timing data, quiesce, based on the representation data, a set of modules of the multi-tier network associated with the event data and/or the timing data using the flag marker, according to one embodiment.

FIG. 9 is a process flow to generate a representation data of a multi-tier network (e.g., a banking system, an online auction system, etc.), embed a flag marker (e.g., a bookmark, a label, etc.) at a transaction event (e.g., an ATM deposit, an ATM withdrawal, a purchase, a return, an exchange, etc.) based on an event data (e.g., system crash, configuration change, failed log-in, etc.) and/or a timing data (e.g., midnight, every 5 minutes, etc.), quiesce, based on the representation data (e.g., a model, a business prototype, a data flow chart, etc.), a set of modules of the multi-tier network (e.g., the tier 1 module 100, the tier 2 module 102, the tier N module 104, etc.) associated with the event data (e.g., system crash, configuration change, failed log-in, etc.) and/or the timing data (e.g., midnight, every 5 minutes, etc.) using the flag marker (e.g., a bookmark, a label, etc.), according to one embodiment.

In operation 902, the representation data of the multi-tier network is generated. In operation 904, the flag marker is embedded at the transaction event based on an event data and/or a timing data. In operation 906, the set of modules of the multi-tier network is quiesced, based on the representation data associated with the event data and/or the timing data using the flag marker. In operation 908, the series of consistency points is determined based on the transaction modeling of data flows between the sets of modules of the multi-tier network.

In operation 910, the data backup operation is automatically performed based on an occurrence of the event associated with the multi-tier network. In operation 912, the timing consistency algorithm is performed along with the data backup operation to ensure data integrity. In operation 914, the set of data at intervals adjacent to the event is coalesced based on a policy data provided through the backup synchronization module 106. In operation 916, the flag marker is associated with an automatic data recovery operation, a data rollback operation, a file rollback operation, and/or a volume rollback operation.

Figure 10:
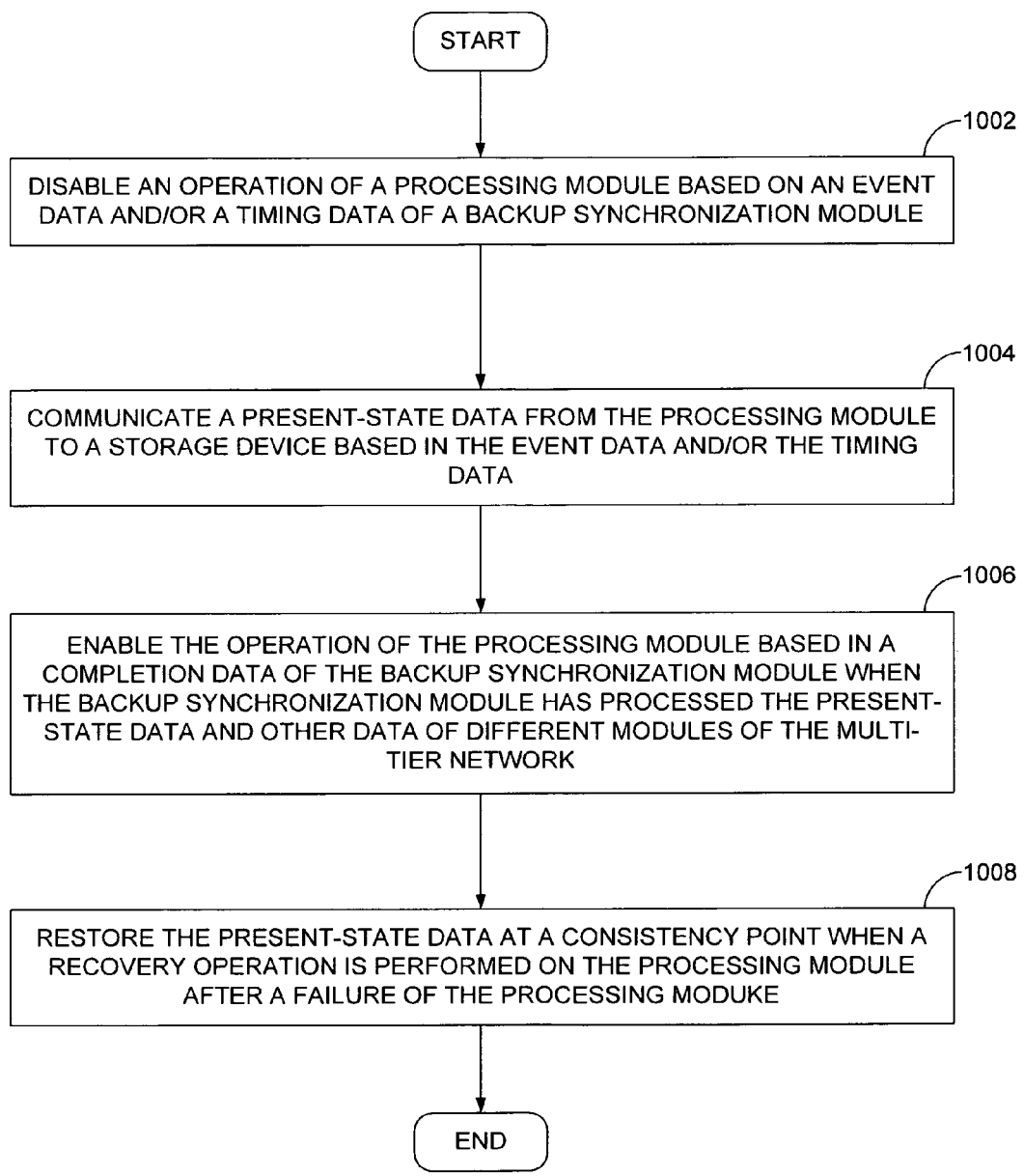
FIG. 10 is a process flow chart to disable an operation of a tier module based on an event data and/or a timing data of a backup synchronization module, according to one embodiment.

FIG. 10 is a process flow chart to disable an operation (e.g., a data storage, a data backup, a data retrieval, a data modification, a data transfer, etc.) of tier module (e.g., the tier 1 module 100, the tier 2 module 102, the tier N module 104, etc.) based on an event data (e.g., system crash, configuration change, failed log-in, etc.) and/or a timing data (e.g., midnight, every 5 minutes, etc.) of the backup synchronization module 106 of FIG. 1, according to one embodiment.

In operation 1002, the operation of the tier module is disabled based on the event data and/or the timing data of the backup synchronization module 106 of FIG. 1. In operation 1004, the present-state data from the tier module is communicated to the storage sub-system based on the event data and/or the timing data. In operation 1006, the operation of the tier module is enabled based on a completion data of the backup synchronization module 106 of FIG. 1 when the backup synchronization module of FIG. 1 has processed the present-state data and other data of different modules of the multi-tier network. In operation 1008, the present-state data is restored at a consistency point when a recovery operation is performed on the tier module after a failure of the tier module.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the tier 1 module 100, the tier 2 module 102, the tier N module 104 backup synchronization module 106, the database module 108, the network time module 110, the system administrator module 112, the tier dependence modeler module 200, the user events generator module 202, the quiescing module 204, the continuous data protection module 206, the coalescing module 216, the special events detector module 208, the flagging module 210, the flag depository module 212, and/or the automatic recovery module 214 may be enabled using transistors, logic gates, and electrical circuits (e.g., application specific integrated ASIC circuitry) using a tier 1 circuit 100, a tier 2 circuit 102, a tier N circuit 104 backup synchronization circuit, a database circuit, a network time circuit, a system administrator circuit, a tier dependence modeler circuit, a user events generator circuit, a quiescing circuit, a continuous data protection circuit, a coalescing circuit, a special events detector circuit, a flagging circuit, a flag depository circuit, and/or a automatic recovery circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

The invention claimed is:

1. A method, comprising:
modeling dataflow between at least one module of a tier of a multi-tier network and at least one module of another tier of the multi-tier network, the tier and the another tier of the multi-tier network being at different geographical locations;
solely marking, in accordance with the model, an instance of a transaction event based on an event data and a time of a backup operation of data associated with the multi-tier network, the event data being at least one of a system crash, a login failure and a configuration change;
quiescing, in accordance with the model, at least one of the at least one module of the tier and the at least one module of the another tier of the multi tier network associated with at least one of the event data and the time of the backup operation based on the marking, the quiescing including determining a sequence of temporary disablement of the at least one of the at least one module of the tier and the at least one module of the another tier;
coordinating, in accordance with the model, with a continuous data protection module of the multi-tier network to perform the backup operation at one of a file level and a block level to ensure data integrity in the multi-tier network consistent with the event data and the time of the backup operation; and
coalescing, in accordance with the model, a set of data at intervals adjacent to an event on whose occurrence the backup operation is based, wherein the coalescing is based on a policy data.

2. The method of claim 1, further comprising determining, during the backup operation of the data associated with the multi-tier network, a series of consistency points in accordance with the model.

3. The method of claim 1, further comprising performing a timing consistency operation to ensure the data integrity in the multi-tier network.

4. The method of claim 1, wherein the event on whose occurrence the backup operation is based is one of: time dependent and time independent.

5. The method of claim 1, wherein the event on whose occurrence the backup operation is based is one of an application dependent event, a packaged event and a user defined event.

6. The method of claim 1, comprising performing the marking, quiescing and the coordination in a storage controller associated with the multi-tier network.

7. A controller of a storage sub-system of a multi-tier network comprising:
a memory; and
a processor communicatively coupled to the memory, the processor being configured to execute instructions associated with:
solely marking, in accordance with a model of dataflow between at least one module of a tier of the multi-tier network and at least one module of another tier of the multi-tier network, an instance of a transaction event based on an event data and a time of a backup operation of data associated with the multi-tier network, the event data being at least one of a system crash, a login failure and a configuration change, and the tier and the another tier of the multi-tier network being at different geographical locations;
quiescing, in accordance with the model, at least one of the at least one module of the tier and the at least one module of the another tier associated with at least one of the event data and the time of the backup operation based on the marking;
coordinating, in accordance with the model, with a continuous data protection module of the multi-tier network to perform the backup operation at one of a file level and a block level to ensure data integrity in the multi-tier network consistent with the event data and the time of the backup operation; and
coalescing, in accordance with the model, a set of data at intervals adjacent to an event on whose occurrence the backup operation is based, wherein the coalescing is based on a policy data.

8. The controller of claim 7, wherein the processor is further configured to execute instructions associated with determining, during the backup operation of the data associated with the multi-tier network, a series of consistency points in accordance with the model.

9. The controller of claim 7, wherein the processor is further configured to execute instructions associated with performing a timing consistency operation to ensure the data integrity in the multi-tier network.

10. The controller of claim 7, wherein event on whose occurrence the backup operation is based is one of: time dependent and time independent.

11. The controller of claim 7, wherein event on whose occurrence the backup operation is based is one of an application dependent event, a packaged event and a user defined event.

12. A multi-tier network comprising:
at least one module of a tier of the multi-tier network and at least one module of another tier of the multi-tier network;
a storage sub-system, wherein the storage sub-system is a non-transitory computer readable medium; and
a controller of the storage sub-system including a processor communicatively coupled to a memory, the processor being configured to execute instructions associated with:
solely marking, in accordance with a model of dataflow between the at least one module of the tier and the at least one module of the another tier, an instance of a transaction event based on an event data and a time of a backup operation of data associated with the multi-tier network, the event data being at least one of a system crash, a login failure and a configuration change, and the tier and the another tier of the multi-tier network being at different geographical locations;
quiescing, in accordance with the model, at least one of the at least one module of the tier and the at least one module of the another tier network associated with at least one of event data and the time of the backup operation based on the marking;
coordinating, in accordance with the model, with a continuous data protection module of the multi-tier network to perform the backup operation at one of a file level and a block level to ensure data integrity in the multi-tier network consistent with the event data and the time of the backup operation; and coalescing, in accordance with the model, a set of data at intervals adjacent to an event on whose occurrence the backup operation is based, wherein the coalescing is based on a policy data.

13. The multi-tier network of claim 12, wherein the processor is further configured to execute instructions associated with determining, during the backup operation of the data associated with the multi-tier network, a series of consistency points in accordance with the model.

14. The multi-tier network of claim 12, wherein the processor is further configured to execute instructions associated with performing a timing consistency operation to ensure the data integrity in the multi-tier network.

* * * * *